(12) United States Patent
Lo

(10) Patent No.: US 7,319,822 B2
(45) Date of Patent: Jan. 15, 2008

(54) SYSTEM AND METHOD OF SPACE-TIME EQUALIZATION TO MITIGATE EFFECTS OF FADING AND SCINTILLATION FOR WIRELESS COMMUNICATION

(76) Inventor: Victor Yeeman Lo, 1212 Masline St., Covina, CA (US) 91722

( * ) Notice: Subject to any disclaimer, the term of this patent is extended or adjusted under 35 U.S.C. 154(b) by 575 days.

(21) Appl. No.: 10/741,819

(22) Filed: Dec. 19, 2003

(65) Prior Publication Data

US 2004/0175176 A1   Sep. 9, 2004

Related U.S. Application Data

(63) Continuation-in-part of application No. 10/325,370, filed on Dec. 20, 2002, now Pat. No. 6,925,258.

(51) Int. Cl.
*H04B 10/00* (2006.01)

(52) U.S. Cl. ........................ 398/161; 398/115

(58) Field of Classification Search ................ 398/141, 398/147, 152, 185, 34, 47, 53, 59, 65, 78, 398/79, 161, 115
See application file for complete search history.

(56) References Cited

U.S. PATENT DOCUMENTS

| | | | |
|---|---|---|---|
| 3,952,304 A * | 4/1976 | Broniwitz et al. ............ 342/95 |
| 4,831,663 A | 5/1989 | Smith | |
| 5,060,225 A | 10/1991 | Godfrey | |
| 5,104,222 A | 4/1992 | Kersey et al. | |
| 5,136,666 A | 8/1992 | Anderson et al. | |
| 5,528,582 A | 6/1996 | Bodeep et al. | |
| 5,793,508 A | 8/1998 | Meli | |
| 5,798,855 A | 8/1998 | Alexander et al. | |
| 5,841,557 A | 11/1998 | Otsuka et al. | |
| 5,872,647 A | 2/1999 | Taga et al. | |
| 5,946,119 A | 8/1999 | Bergano et al. | |
| 6,025,944 A | 2/2000 | Mendez et al. | |
| 6,038,357 A | 3/2000 | Pan | |
| 6,049,576 A * | 4/2000 | Magill ........................ 375/365 |
| 6,057,950 A | 5/2000 | Bergano | |
| 6,078,418 A | 6/2000 | Hansen et al. | |
| 6,385,356 B1 | 5/2002 | Jopson et al. | |
| 6,427,043 B1 | 7/2002 | Naito | |
| 6,580,701 B1 | 6/2003 | Ylitalo et al. | |
| 6,628,969 B1 * | 9/2003 | Rilling ........................ 455/561 |
| 6,631,018 B1 | 10/2003 | Milton et al. | |

(Continued)

OTHER PUBLICATIONS

Lo, Y.V., "On a Statstical Space-Time Modulation Theory," Proc. IEEE P.R. Conf. On Communications, Computers and Signal Processing, pp. 584-589, Victoria, B.C., Canada, Jun. 1989.

*Primary Examiner*—Dalzid Singh
(74) *Attorney, Agent, or Firm*—Joseph E. Mueth, Esq.

(57) ABSTRACT

A system and method is disclosed for mitigating the scintillation and fading effects of baseband wireless, radio frequency wireless, optical wireless and satellite communication links. The system uses a space-time channel model to derive an optimal processing architecture for signal recovery through a scintillation channel. The signal power is collected by space-time sampling within the four dimensional volume of the spatial and temporal spread. Consequently, the space-time equalizer can effectively recover the lost signal power induced by the spreading effects of atmospheric scintillating medium. The advantages of this invention include a decrease in link outages resulting in higher link availability and more reliable data network services.

42 Claims, 14 Drawing Sheets

U.S. PATENT DOCUMENTS

| | | |
|---|---|---|
| 6,915,077 B2 | 7/2005 | Lo |
| 7,095,993 B2 * | 8/2006 | You et al. ............... 455/192.2 |
| 7,146,109 B2 * | 12/2006 | Chen et al. ............... 398/183 |
| 2001/0030787 A1 | 10/2001 | Tajima |
| 2001/0030993 A1 | 10/2001 | Bottomley et al. |
| 2001/0035997 A1 | 11/2001 | Agazzi |
| 2001/0095997 | 11/2001 | Agazzi |
| 2002/0080436 A1 | 6/2002 | Hait |
| 2003/0002099 A1 | 1/2003 | Sayyah et al. |
| 2004/0052306 A1 | 3/2004 | Ibrahim et al. |

* cited by examiner

SYSTEM AND METHOD OF SPACE-TIME EQUALIZATION TO MITIGATE EFFECTS OF FADING AND SCINTILLATION FOR WIRELESS COMMUNICATION

This application is a Continuation-In-Part of application Ser. No. 10/325,370, filed Dec. 20, 2002 now U.S. Pat. No. 6,925,258.

BACKGROUND OF THE INVENTION

1. Field of the Invention

This invention relates to a system and method to improve data transmission performance of a radio frequency (RF) wireless and optical wireless digital communication link by reducing signal degradation due to fading and scintillating channel.

2. Background Information

With the growth of worldwide telecom infrastructure, broadband wireless connectivity via radio and optical frequencies has been considered to be the future of the global telecommunication industry. The communication efficiency associated with transmitting information is known to be dependent upon the signal design, error correction code as well as the characteristics of the transmission medium. While there are advancements in high-speed digital processing in the time domain to remove signal degradations at the receiver, there has been little progress to utilize the additional dimensions in the spatial domain to support data recovery operations.

One approach to mitigate the effects of scintillation is error correction code as shown in U.S. Patent Application Publication No. 20020157060. For example, Reed-Solomon code in conjunction with data interleaver is effective in combating error bursts. The cost is the overhead associated with sending the parity bytes needed for the decoder, latency of decoding operation as well as complexity to implement the codec and interleaving/deinterleaving circuits.

Another approach is to perform repeated transmission until an acknowledgement is received. A detailed operation of this approach is disclosed and described in U.S. Pat. No. 6,043,918. This concept is similar to the reliable transport control protocol (TCP) at the network layer. The challenge is to choose the right duration for the acknowledgement time-out without artificially inducing a data traffic bottleneck due to retransmission.

One other solution is to provide signal strength feedback to the transmitter (described in U.S. Pat. No. 6,285,481). Data transmissions can be suspended until scintillation activities subside allowing signal power to return back to the nominal level. However, link suspension reduces network availability and decreases subscriber satisfaction.

Also, a receiving system with multiple optical detectors is described and proposed in U.S. Pat. No. 6,243,182. The patent shows a spatial combiner scheme to capture optical power lost due to scintillation. However, it does not reveal the critical design in calculating the spacing between detectors and the size of the array needed to accomplish the job of a spatial scintillation equalizer. Furthermore, no temporal equalization is suggested as part of an overall solution to the problem of scintillation.

It is one object of the present invention to provide a system and method to mitigate the effects of fading and scintillation on a radio frequency (RF) and optical wireless signals.

It is another object of the present invention to provide an optimal signal equalization scheme simultaneously in both the spatial and temporal domains.

Yet it is another object of the present invention to perform an optimal recovery of lost transmission power of the wireless signal at the receiver.

Still another object of the present invention to apply space-time sampling as compared to separate spatial or temporal sampling in receiver signal processing.

Still another object of the present invention to apply space-time equalization to single mode time modulated optical communication links for terrestrial wireless and satellite communications.

Still another object of the present invention to apply the space-time equalization to single beam time modulated RF wireless communication links for terrestrial wireless and satellite communications.

Still another object of the present invention to apply space-time equalization to single mode space-time modulated optical communication links for terrestrial wireless and satellite communications.

Still another object of the present invention to apply space-time equalization to multimode space-time modulated optical communication links for terrestrial wireless and satellite communications.

Still another object of the present invention to apply space-time equalization to multimode multi-antenna space-time modulated optical communication links for terrestrial wireless and satellite communications.

Still another object of the present invention to apply space-time equalization to single beam space-time modulated RF wireless communications link for terrestrial wireless and satellite communications.

Still another object of the present invention is to apply space-time equalization to multi-beam space-time modulated RF wireless communication links for terrestrial wireless and satellite communications.

Still another object of the present invention is to apply space-time equalization to multi-beam multi-antenna space-time modulated RF communication links for terrestrial wireless and satellite communications.

Still another object of the present invention is to maximize the throughput of a wireless radio frequency transmission system by using space-time equalization.

Still another object of the present invention is to maximize the throughput of a wireless optical transmission system by using space-time equalization.

Still another object of the present invention is to maximize the throughput of a satellite transmission system by using space-time equalization.

BRIEF DESCRIPTION OF THE INVENTION

The purpose of the present invention is to recover a wireless signal that has been spread in both space and time. As a wireless signal transverses through an atmospheric medium, the electromagnetic pulse is spread in both space and time. The temporal technique of tapping delay line equalization is effective against the time spread dispersion. It only provides a partial solution to the problem. The spatial dispersion resulting in beam spread, beam wander and multipath remains uncompensated. Conversely, a properly designed spatial combiner that adheres to spatial sampling theorem is only effective against spatial dispersion. To that end, a combined simultaneous equalization in space and time provides a complete solution to mitigate the effects of fading and scintillation.

The basis of the present invention disclosed herein is a direct application of the space-time system field theory to wireless RF and wireless optical communications. The fundamental theory related to the present invention is described by Victor Lo in "*On A Statistical Space-Time Modulation Theory*," Proc. IEEE P. R. Conference on Communications, Computers and Signal Processing, pp. 584-589, Victoria, B. C., Canada, June 1989. The space-time modulation provides capacity expansion by utilizing the three-dimensional spatial field in addition to the classical temporal domain. The spatial modulation can be expressed in the form of changes in vector directions of the spatial carriers, Ex, Ey as well as the specific spatial location where the electric field is illuminated. The relationship of the x,y components and the propagation direction z forms the basis functions for data transmission. When the spatial dimension is not being used as in the case of a linearly polarized signal, all data loading is limited in time along the propagation axis pointing at only one receiver location. Assuming a space-time separable channel, the temporal information carrier on the propagation axis becomes independent of the transverse plane where the relative phase position (state of polarization) can be modulated. Multiple spatial modes and feeds can also be generated from a single antenna aperture to transmit independently and concurrently to multitude of receiver locations. By utilizing both spatial and temporal modulation, total system throughput can be substantially increased. However, due to scintillation and fading effects of the propagation channel, the maximum data capacity may not be attainable. To mitigate the channel degradation, a component of the space-time modulation theory known as the space-time sampling theorem can be used to construct the space-time channel model. The space-time channel model enables optimal signal recovery and processing at the receiver. This general solution to combat scintillation effects is applicable to various signals including space-time modulated signal, temporally modulated spatially spread signal, spatially modulated temporally spread signal, and space-time modulated space-time spread signal.

For an RF multi-feed and an optical multi-mode single antenna communication system for both terrestrial and satellite communications, each feed and each mode can be independently space-time modulated, and thus carry separate polarization modulated and temporal modulated messages. The capacity is limited by the total number of independent RF feeds and optical modes supportable by the scintillation channel. The scintillation activities characterized by the correlation time and correlation distance will determine the space-time sampling parameters needed to perform optimal received signal recovery. Details of the signal processing are described by Victor Lo in the "*Space-Time Optical Channel Model for Mobile FSO Networks*" SPIE Proceedings, vol. 5160, August 2003. The complexity of the receiver will increase quickly because each RF feed and each optical mode will have to be independently detected and demodulated. RF multi-feed design is described by Te-Kao Wu in "Meander-Line Polarizer for Arbitrary Rotation of Linear Polarization," IEEE Microwave and Guided Wave Letter, vol. 4, no. 6, June 1994. Optical multi-mode design is described by Gagliardi and Karp in "Optical Communications," Wiley Interscience, New York, 1976. The same concept can be reduced to the simple case of single RF feed and single optical mode communication systems. It can also be extended to the complex case of RF multi-feed multi-antenna and optical multi-mode multi-antenna communication systems.

One application of this space-time equalizer disclosed herein is for commercial fixed and mobile RF wireless services, where atmospheric scintillation and fading can degrade the system performance. A single-feed single antenna link can be easily expanded to a multi-channel architecture using a multi-feed antenna with each feed transmitting an independent spatial beam or channel. A further extension is possible by deploying multiple antennas with each antenna carrying multiple feeds. The space-time equalizer recovers the spread signal power. It restores the system performance by maintaining the signal to noise power ratio.

Another application is single mode free space optical communications with direct or indirect modulation. The optical signal is amplified and transmitted through an optical antenna. With proper antenna pointing, the receiver optical antenna field of view and the transmit antenna beamwidth achieves a near line-of-sight geometry. At the receiver, the optical space-time equalizer maximally recombines the received spread signal. This is followed by space-time demodulation and decoding.

Yet another application of the invention is to extend the single mode space-time equalizer to a multi-mode single antenna space-time equalizer.

Another application of the invention is to extend the multi-mode single antenna space-time equalizer to a multi-mode multi-antenna space-time equalizer.

Yet another application of the invention is to equalize satellite signal transmission in single beam, single mode, multi-beam, multi-mode and multi-antenna systems at both the RF and optical bands.

The above and other objects, advantages, and novel features of the invention will be more fully understood from the following detailed description and the accompanying drawings, in which:

DETAILED DESCRIPTION OF THE INVENTION

In accordance with the invention disclosed herein, a signal from a RF wireless, free-space optical and satellite communication link through a scintillation channel are degraded due to spatial and temporal dispersion. The classical temporal technique of tap delay line equalization is only effective against time dispersion. With this invention, the signal power is reassembled by space-time sampling within the four dimensional volume of the spatial and temporal spread. As a result, the space-time equalizer can recover the lost signal power induced by the effects of an atmospheric scintillating medium. Wireless link outages can now be minimized. This invention enhances the quality of services (QOS) of a wireless data network by maintaining data throughput and link availability.

Figure 1A:
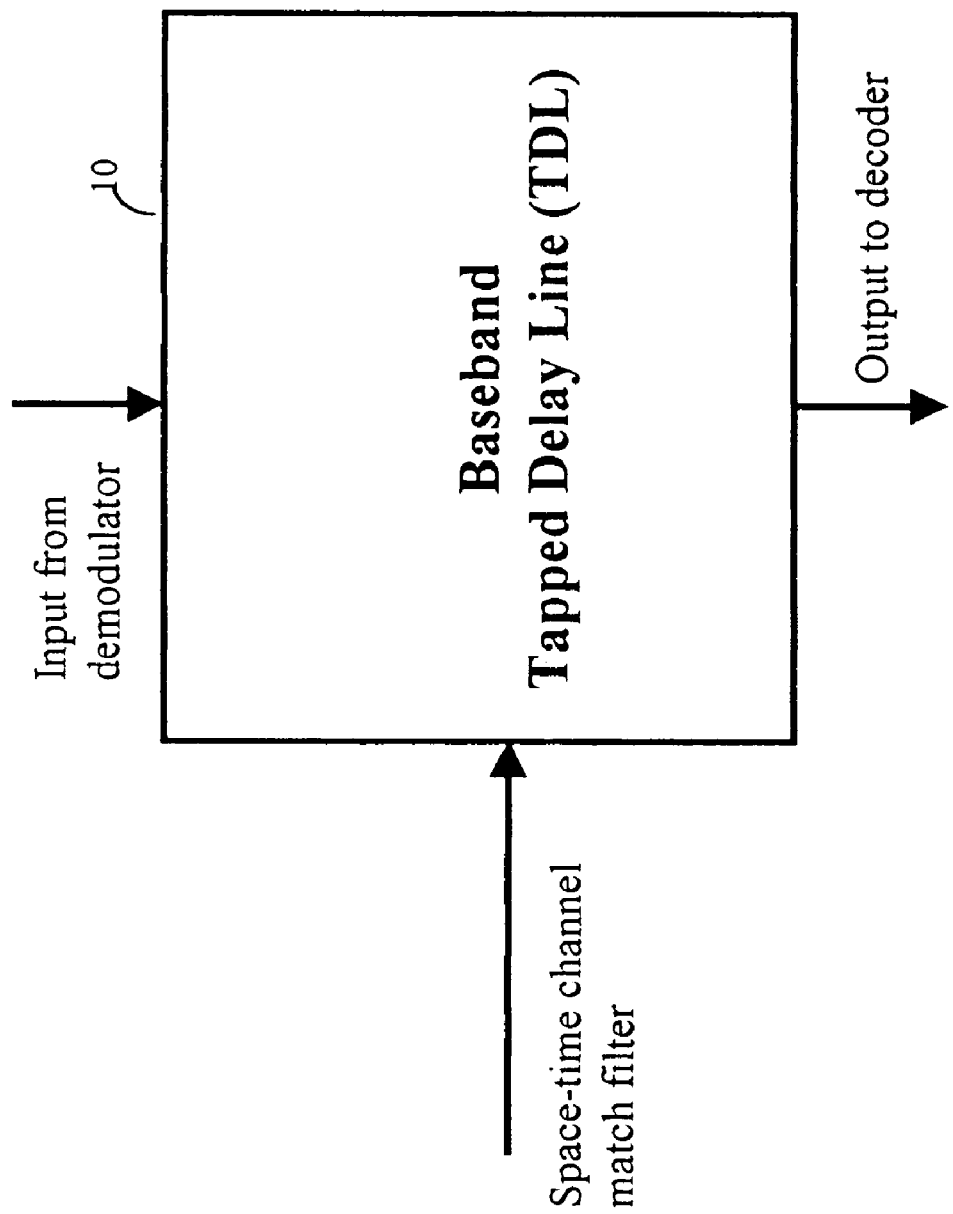
FIG. 1A shows a block diagram illustrating the prior art method of temporal equalization of scintillation and fading effects using a tapped delay line for a single feed or a single mode antenna system at the baseband.
Figure 2:
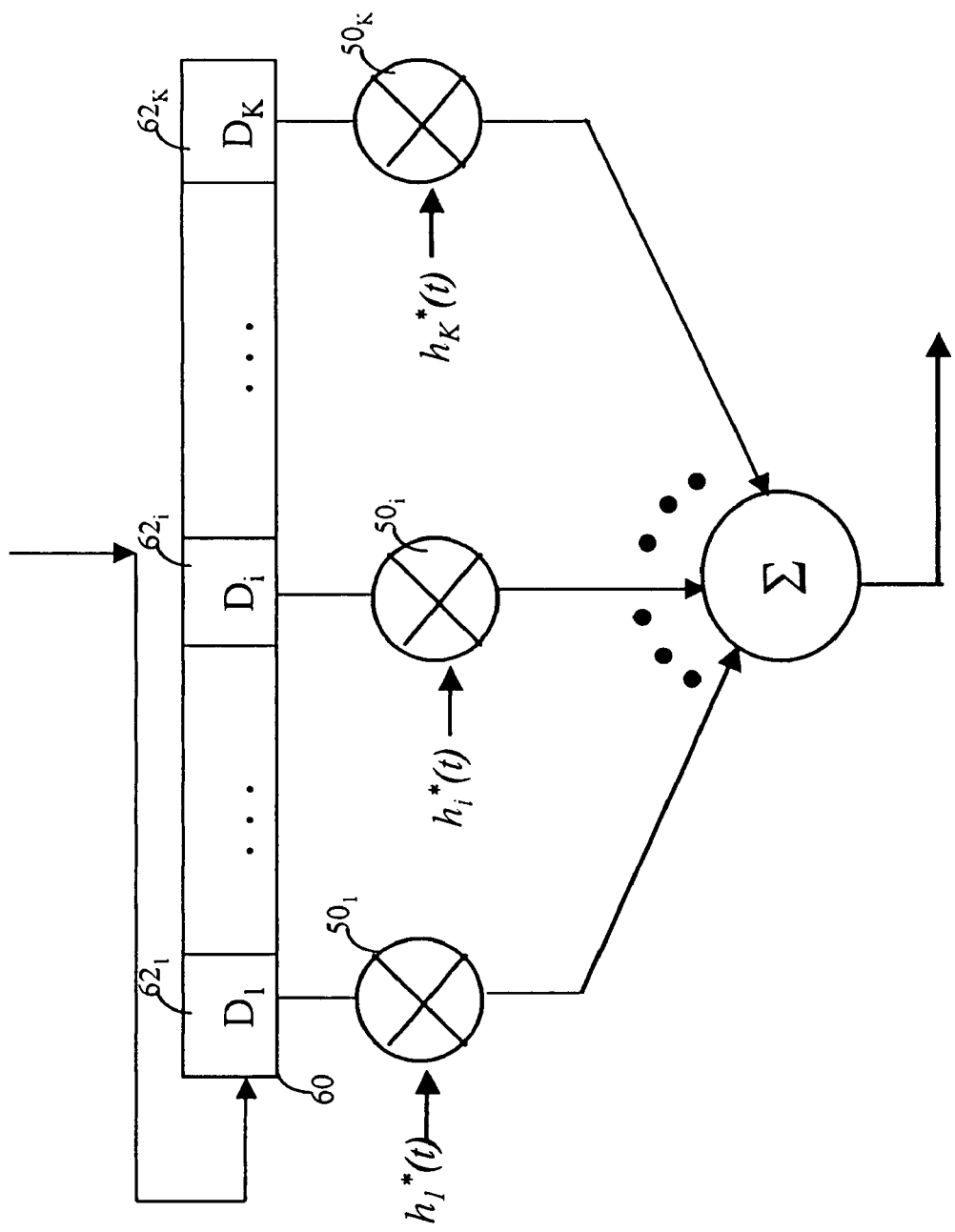
FIG. 2 is a schematic block diagram illustrating the prior art method of the internal processing of a tapped delay line temporal equalizer.

The prior art implementation of a temporal equalizer 10, using a tapped delay line for a single feed or a single mode antenna system at the baseband is shown in FIG. 1A. The demodulated signal is sequentially passed through a line of delay elements at the baseband frequency, 60 in FIG. 2. The conjugate of the temporal impulse response function of the channel match filter is: $h_i^*(t)$, where:
  i is the time delay index from 1 to K, and
  t is the reference time at the receiver.

These delay elements can be implemented digitally with shift registers. At each element, $62_1$ to $62_K$, the signal is tapped and scaled, $50_1$ to $50_K$, according to the temporal channel match filter, h(t). They are summed together, 40 as a combination of a temporally spread signal components.

Figure 1B:
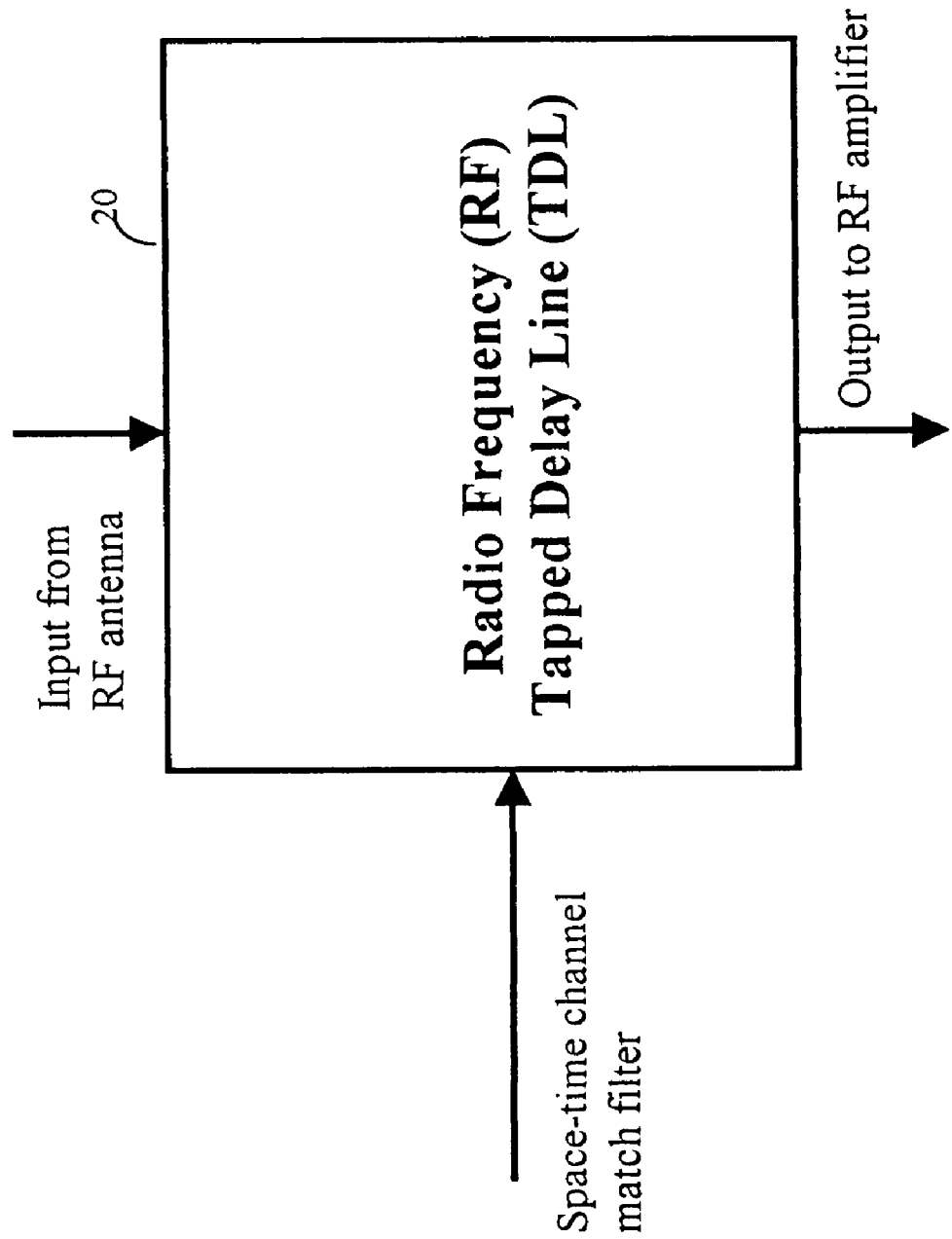
FIG. 1B is a block diagram illustrating the prior art method of temporal equalization of scintillation and fading effects using a tapped delay line for a single feed antenna system at the RF band.

Beside baseband, the implementation of temporal equalizer 20 (FIG. 1B) can also be done in the RF domain at the front-end of the receiver prior to demodulation. In this case, delay elements $62_1$ to $62_K$ are constructed using radio frequency phase shifters for delays and RF couplers for tapped output. RF multipliers $50_1$-$50_K$ and summer 40 are used next for the multiplication and summation operations before amplification.

Figure 1C:
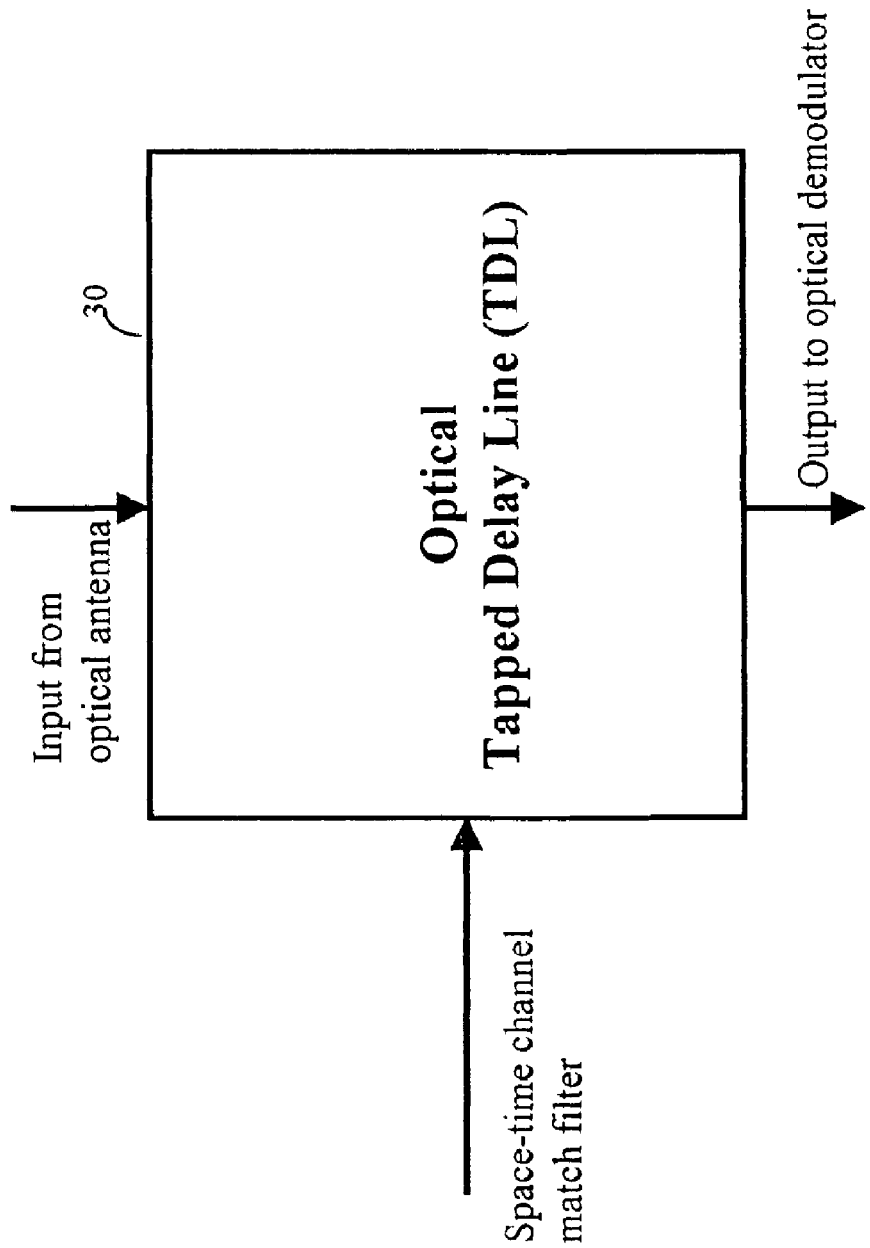
FIG. 1C is a block diagram illustrating the prior art method of temporal equalization of scintillation and fading effects using a tapped delay line for a single mode antenna system at the optical band.

Similarly, the implementation of temporal equalizer 30 (FIG. 1C) can be done in the optical frequency domain at the receiver front-end. In this case, delay elements, $62_1$ to $62_K$ are constructed using lens and optical splitters for delays and tapped output. Optical multipliers $50_1$-$50_K$ and summer 40 are used next for signal multiplication and summation operations before optical demodulation.

Figure 3A:
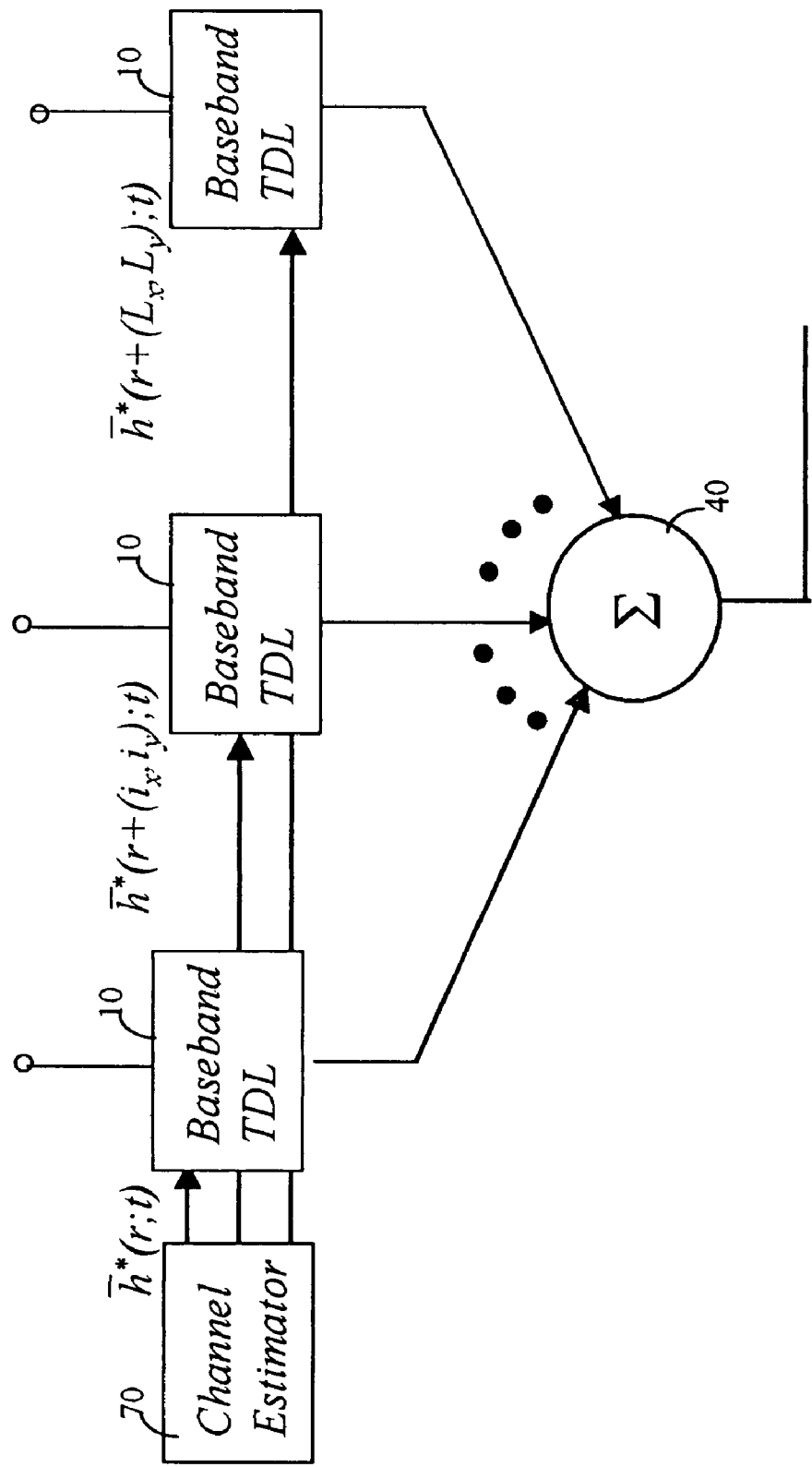
FIG. 3A is a schematic block diagram illustrating one embodiment of a space-time equalizer of scintillation and fading effects for a single feed or single mode antenna system at the baseband according to the invention.

One embodiment of the invention of a baseband space-time equalizer for a wireless communication link with a single feed or a single mode antenna is illustrated in FIG. 3A. The conjugate vector of space-time impulse response function of the channel match filter at reference location r is:

$$\bar{h}^*(r;t)=[h^*(r;t) \ldots h_i^*(r;t) \ldots h_K^*(r;t)] \quad \text{(Equation 1)}$$

where: i is the time delay index from 1 to K,
  t is the reference time at the receiver,
  r is the reference spatial position of the receiver; and $\bar{h}^*[r+(i_x, i_y);t]$ is a conjugate vector of the impulse response function at location $r+(i_x, i_y)$, where: $i_x, i_y$ are spatial delays in reference to r,
  they range from unit sampling distance up to the full correlation distance, and $\bar{h}^*[r+(L_x, L_y);t]$ is the conjugate vector of the impulse response function at locations $r+(L_x, L_y)$, where: $L_x, L_y$ are the correlation distances in x,y directions of the receiver.

Figure 6:
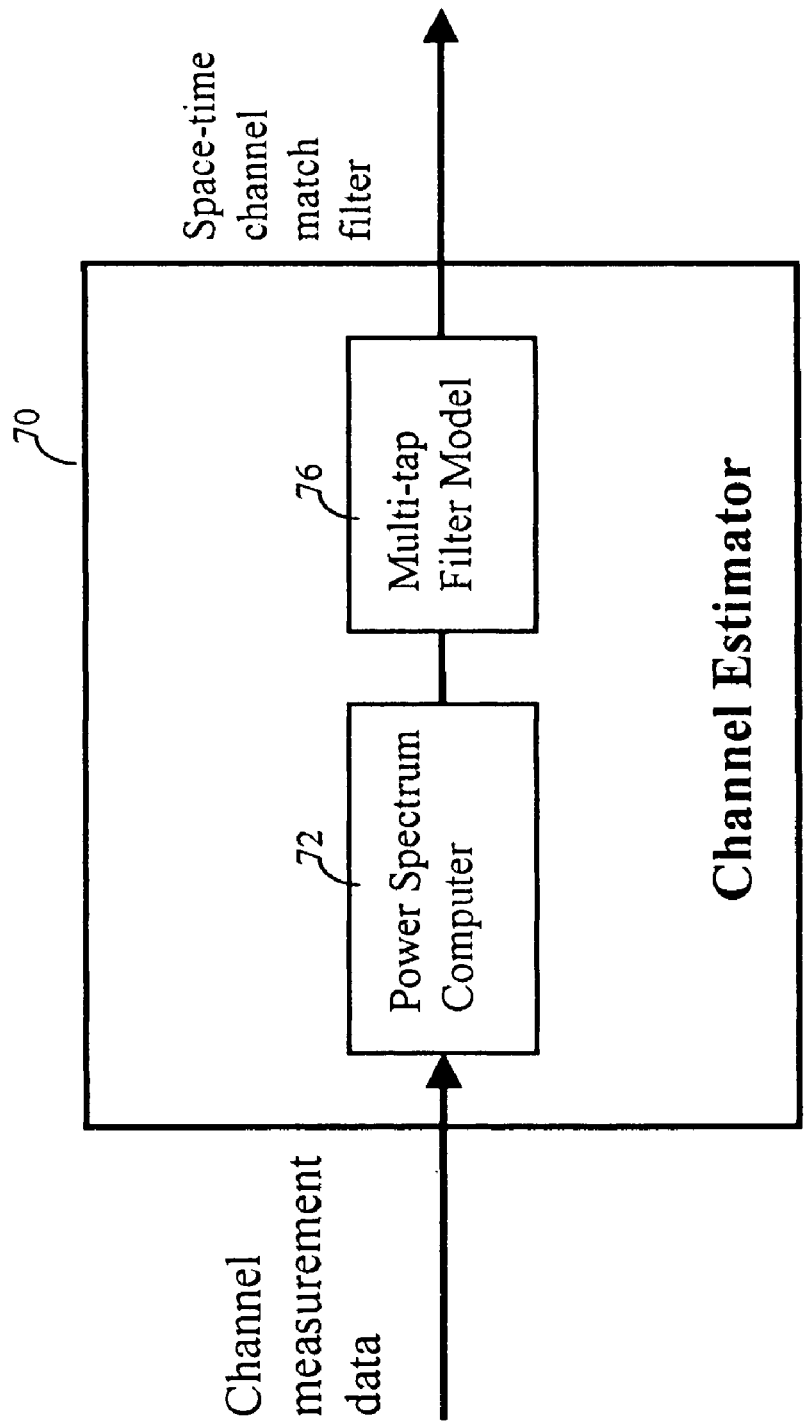
FIG. 6 is a schematic block diagram of a scintillation channel estimator to provide an estimation of channel power spectrum and its match filter.

It consists of a plurality of baseband tapped delay lines 10. Each tapped delay line 10 receiving an input from one spatial sampling point augmenting the signal power collection from the original feed antenna. The outputs of baseband tapped delay lines 10 are summed together 40 before decoding. The separation between adjacent points is determined by the sampling distance up to the maximum width set by the baseband signal correlation distance. Space-time match filter 76 is provided by channel estimator 70 (FIG. 6). Channel estimator 70 estimates space-time power spectrum 72 of the channel and derives a space-time match filter 76 to equalize its effects.

Figure 3B:
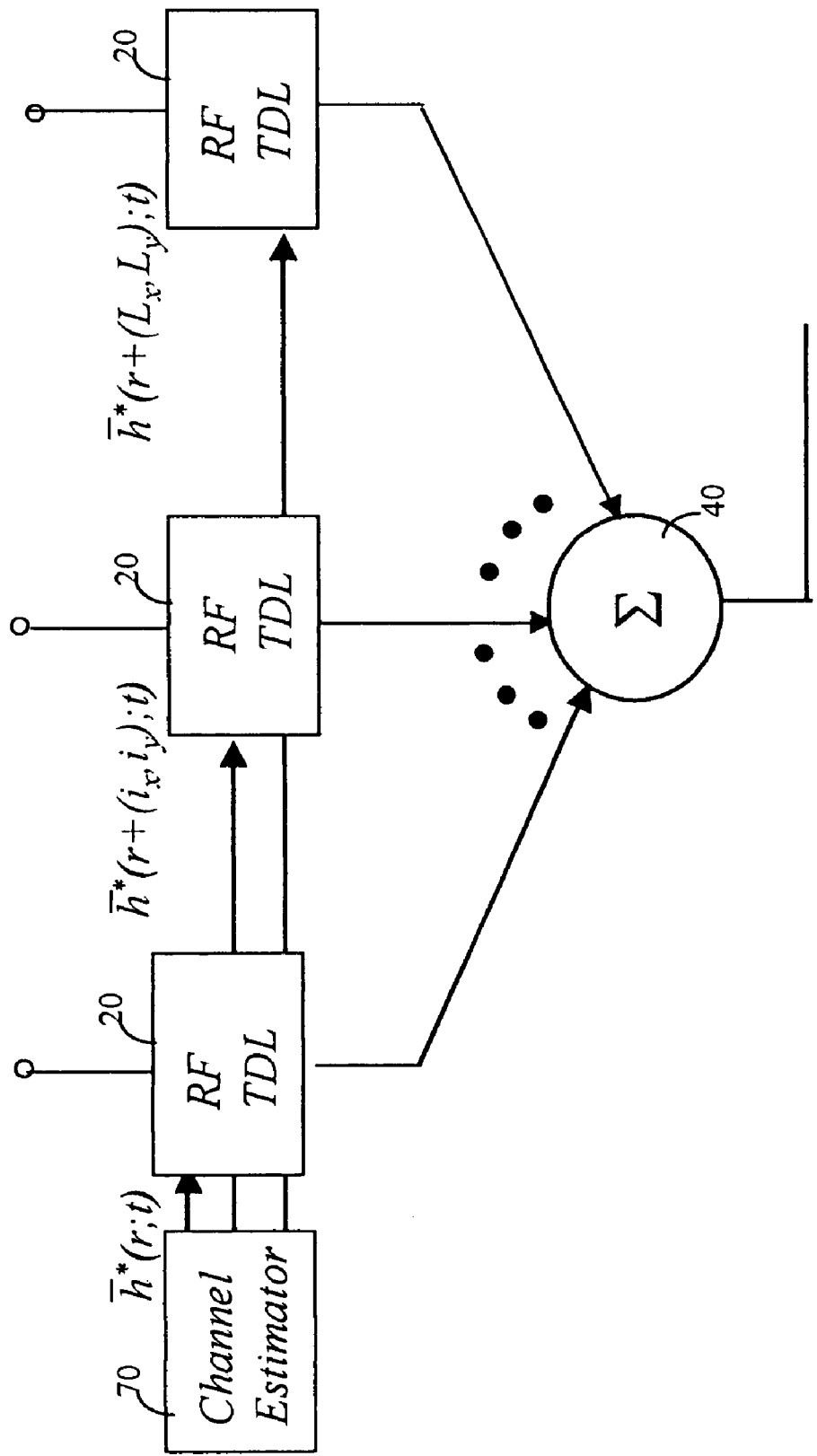
FIG. 3B is a schematic block diagram illustrating another embodiment of a space-time equalizer of scintillation and fading effects for a single feed antenna system at the RF band.

Another embodiment of the invention of space-time equalizer in the RF frequency domain for a wireless communication link with a single feed antenna is illustrated in FIG. 3B. It consists of a plurality of RF tapped delay lines 20. Each tapped delay line 20 receives input from one spatial sampling point. They are summed together 40 before RF amplification and demodulation. The separation between adjacent points is determined by the sampling distance up to the maximum width set by the RF signal correlation distance. The space-time match filter is provided by channel estimator 70 (FIG. 6). Channel estimator 70 estimates the space-time power spectrum 72 of the channel and derives a space-time match filter 76 to equalize its effects.

Figure 3C:
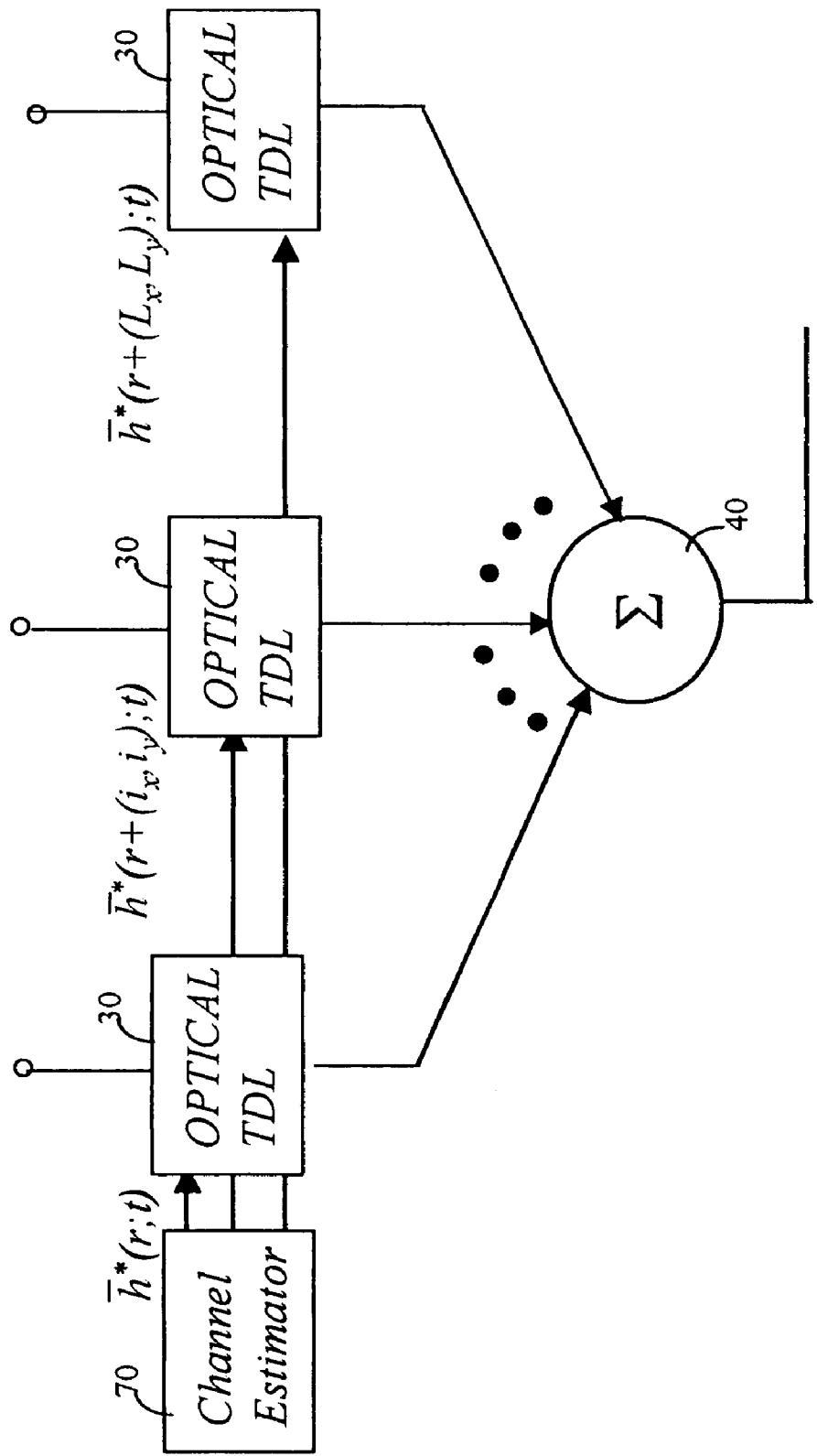
FIG. 3C is a schematic block diagram illustrating another embodiment of a space-time equalizer of scintillation and fading effects for a single mode antenna system at the optical band.

Yet another embodiment of the invention of space-time equalizer in the optical frequency domain for a wireless communication link with a single mode antenna is illustrated in FIG. 3C. It consists of a plurality of optical tapped delay lines 30. Each tapped delay line 30 receives input from one spatial sampling point. They are summed together 40 before optical demodulation. The separation between adjacent points is determined by the sampling distance up to the maximum width set by the optical signal correlation distance. The space-time match filter is provided by the channel estimator 70 (FIG. 6). Channel estimator 70 estimates space-time power spectrum 72 of the channel and derives space-time match filter 76 to equalize its effects.

Figure 4A:
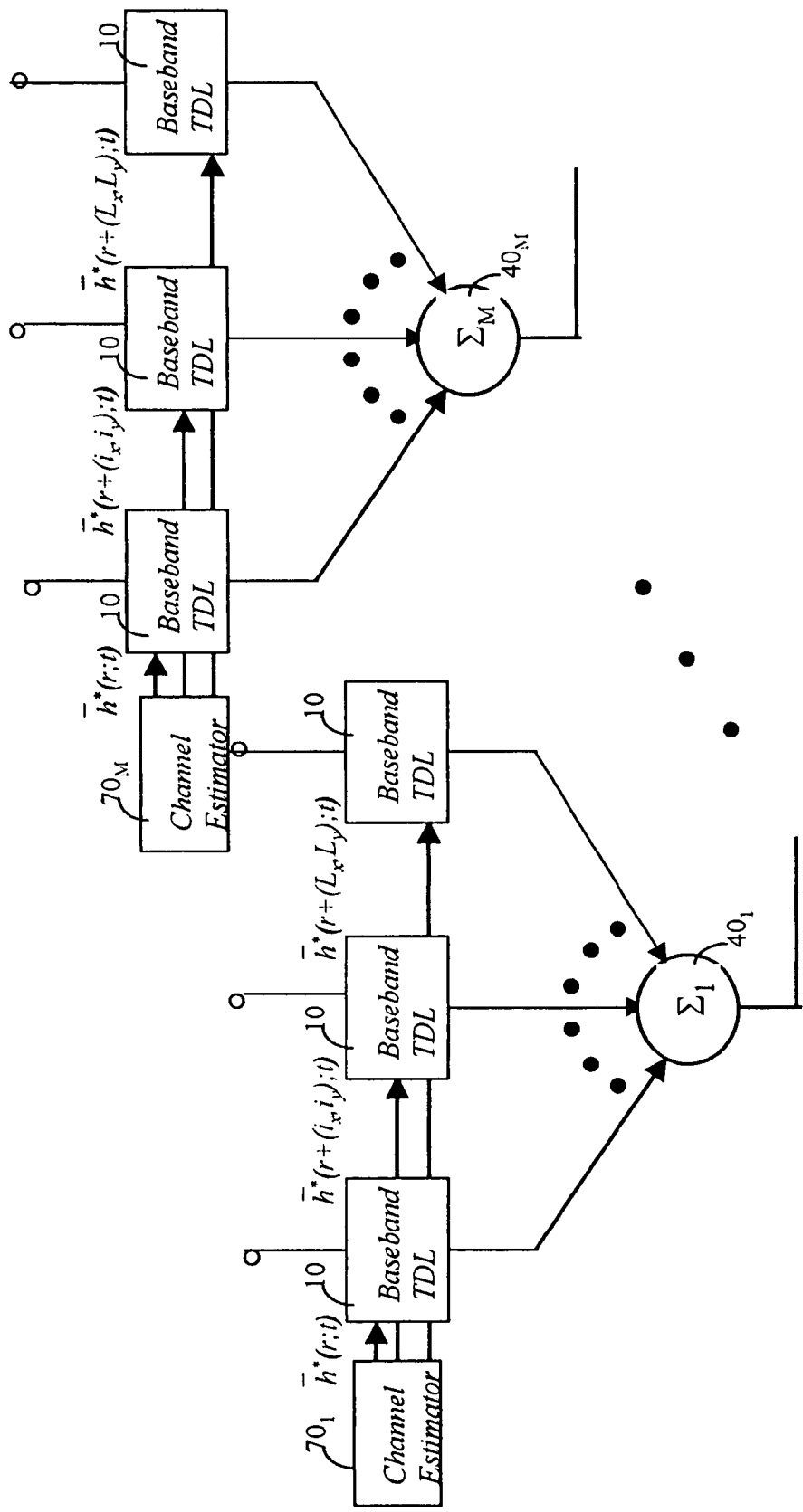
FIG. 4A is a schematic block diagram illustrating another embodiment of a space-time equalizer of scintillation and fading effects for a multi-feed or a multi-mode antenna system at the baseband.

Another embodiment of the invention of baseband space-time equalizer for a wireless communication link with a multi-feed or multi-mode antenna is illustrated in FIG. 4A. It consists of a plurality of baseband tapped delay lines 10 for a plurality of feeds or modes. They are individually summed $40_1$ to $40_M$ together before decoding. The separation between adjacent points of any one feed or mode is determined by the sampling distance up to the maximum width set by the baseband signal correlation distance. Space-time match filter 76 is provided by channel estimators $70_1$ to $70_M$.

Figure 4B:
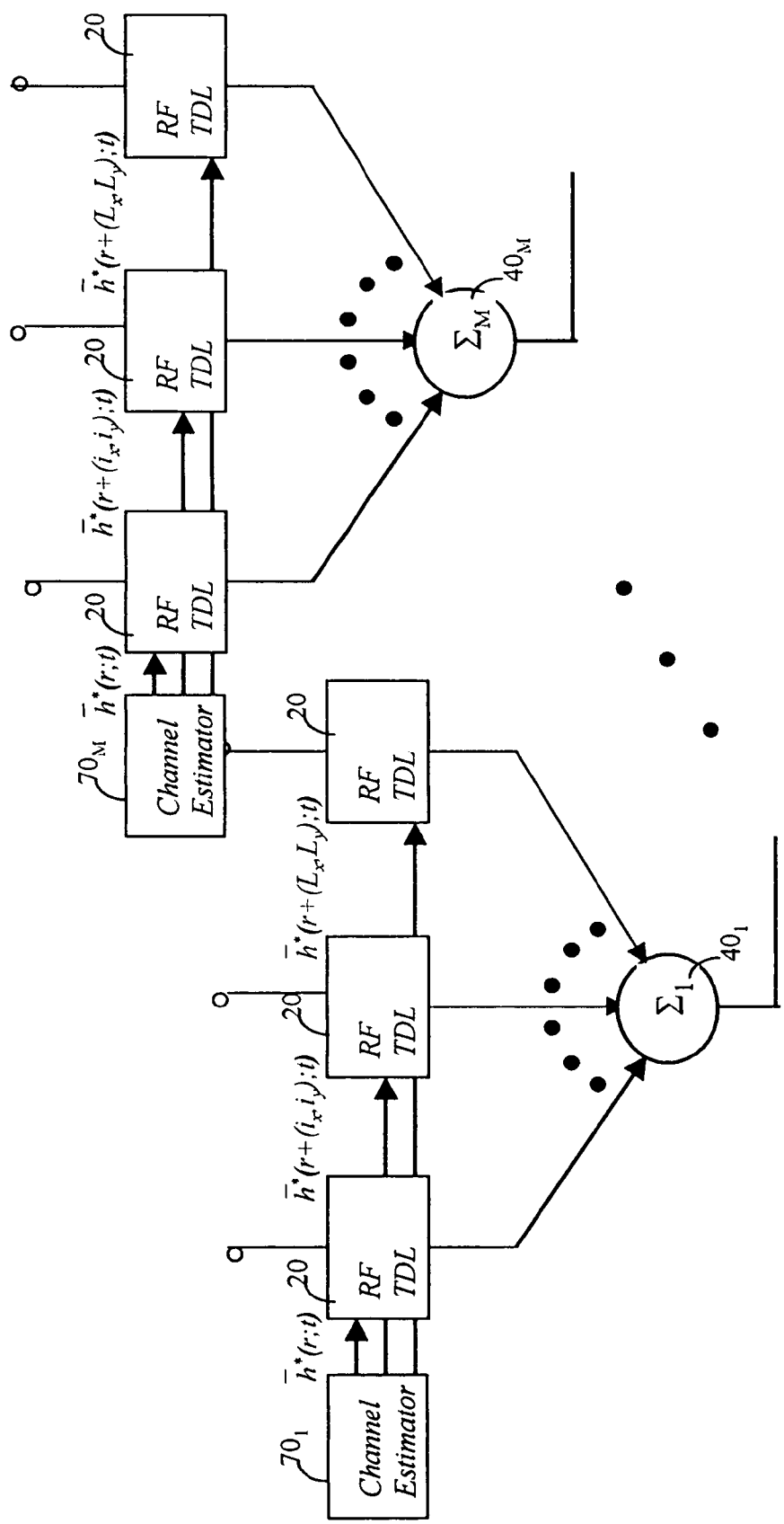
FIG. 4B is a schematic block diagram illustrating another embodiment of a space-time equalizer of scintillation and fading effects for a multi-feed antenna system at the RF band.

Another embodiment of the invention of space-time equalizer in the RF frequency domain for a wireless communication link with a multi-feed antenna is illustrated in FIG. 4B. It consists of a plurality of RF tapped delay lines 20 for a plurality of feeds. They are individually summed together $40_1$ to $40_M$ before RF amplification and demodulation. Space-time match filter 76 is provided by the channel estimators $70_1$ to $70_M$.

Figure 4C:
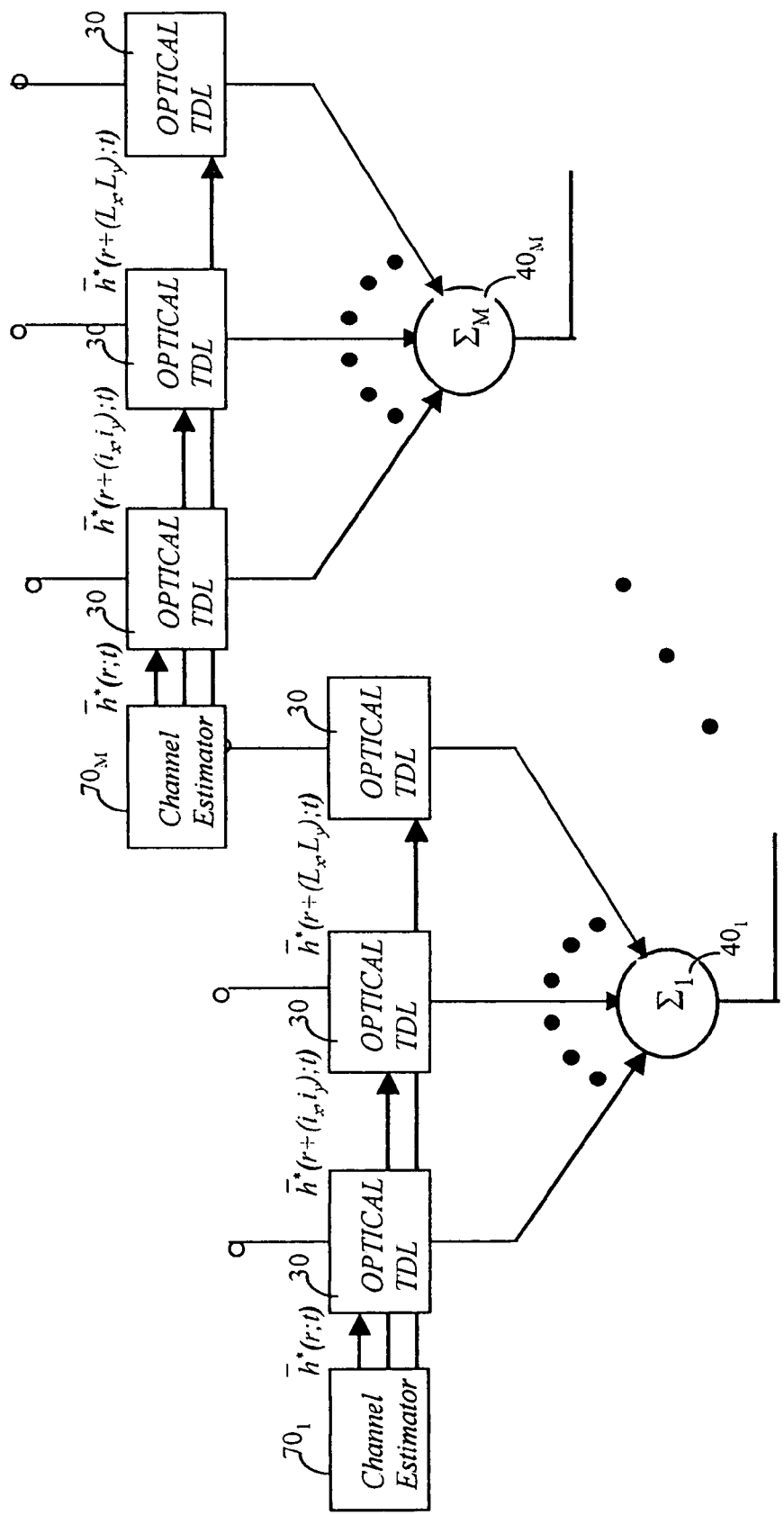
FIG. 4C is a schematic block diagram illustrating another embodiment of a space-time equalizer of scintillation and fading effects for a multi-mode antenna system at the optical band.

Another embodiment of the invention of space-time equalizer in the optical frequency domain for a wireless communication link with a multi-mode antenna is illustrated in FIG. 4C. It consists of a plurality of optical tapped delay lines 30 for a plurality of feeds. They are individually summed together $40_1$ to $40_M$ before optical demodulation. Space-time match filter 76 is provided by the channel estimator, $70_1$ to $70_M$.

Figure 5A:
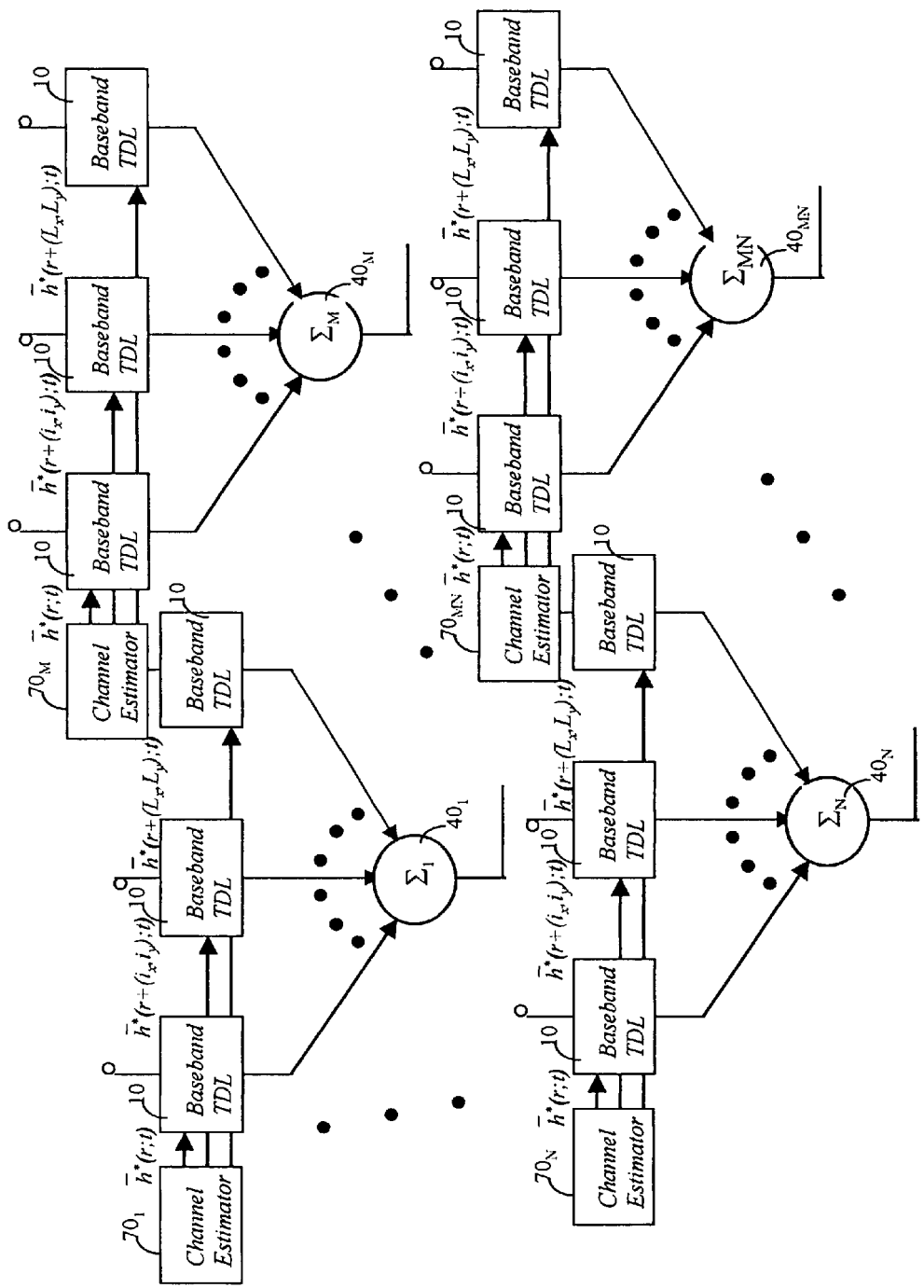
FIG. 5A is a schematic block diagram illustrating another embodiment of a space-time equalizer of scintillation and fading effects for a multi-feed or a multi-mode multi-antenna system at the baseband.

Another embodiment of the invention of baseband space-time equalizer for a wireless communication link with a multi-feed or multi-mode multi-antenna system is illustrated in FIG. 5A. It consists of a plurality of baseband tapped delay lines 10 for a plurality of feeds or modes and a plurality of antennas. They are individually summed $40_1$ to $40_{MN}$ together before decoding. The separation between adjacent points of any one feed or mode of any one antenna is determined by the sampling distance up to the maximum width set by the baseband correlation distance. Space-time match filter 76 is provided by channel estimators $70_1$ to $70_{MN}$.

Figure 5B:
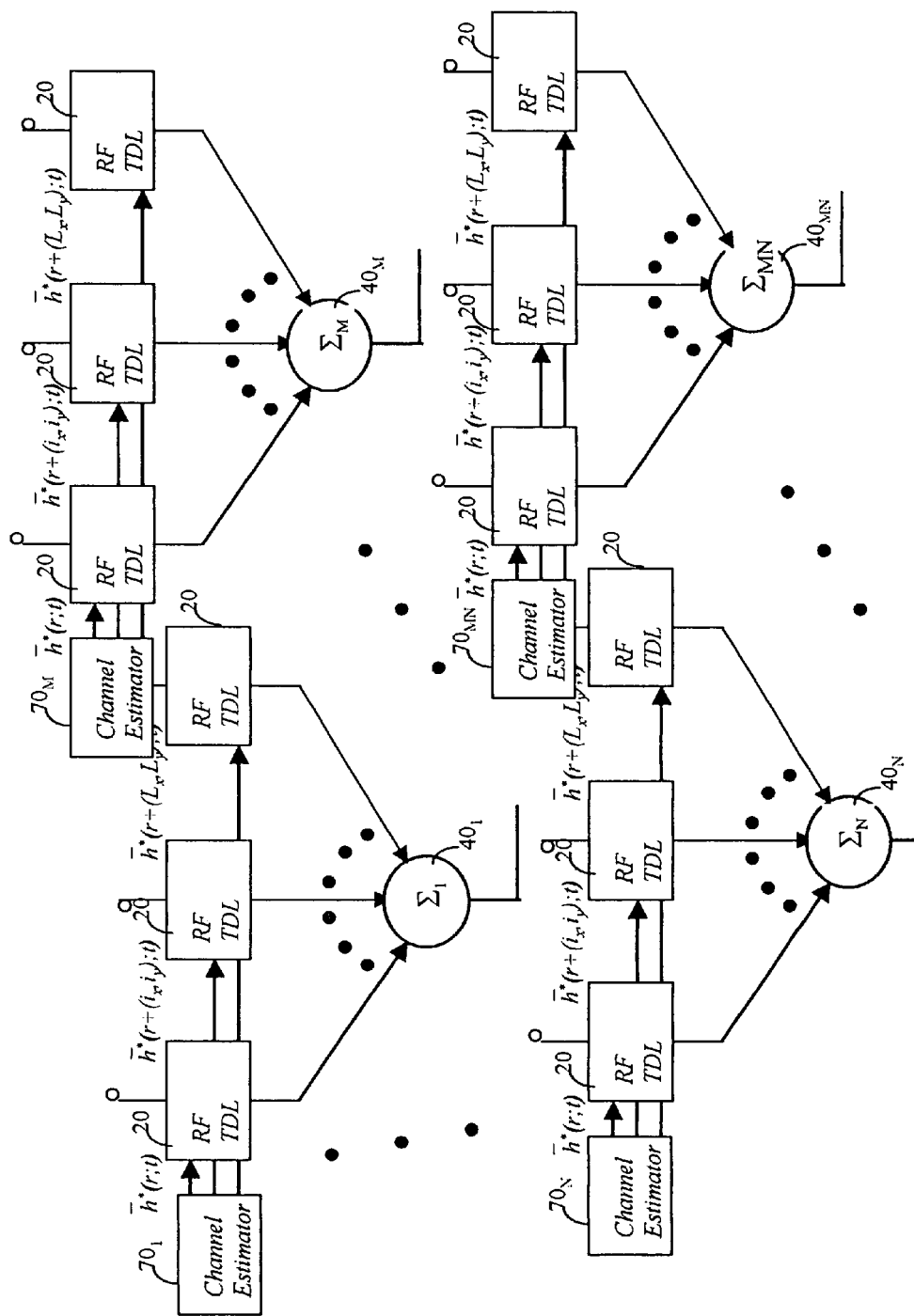
FIG. 5B is a schematic block diagram illustrating another embodiment of a space-time equalizer of scintillation and fading effects for a multi-feed multi-antenna system at the RF band.

Another embodiment of the invention of space-time equalizer in the RF frequency domain for a wireless communication link with a multi-feed multi-antenna system is illustrated in FIG. 5B. It consists of a plurality of RF tapped delay lines 20 for a plurality of feeds and a plurality of antennas. They are individually summed together $40_1$ to $40_{MN}$ before RF amplification and demodulation. Space-time match filter 76 is provided by the channel estimators $70_1$ to $70_{MN}$.

Figure 5C:
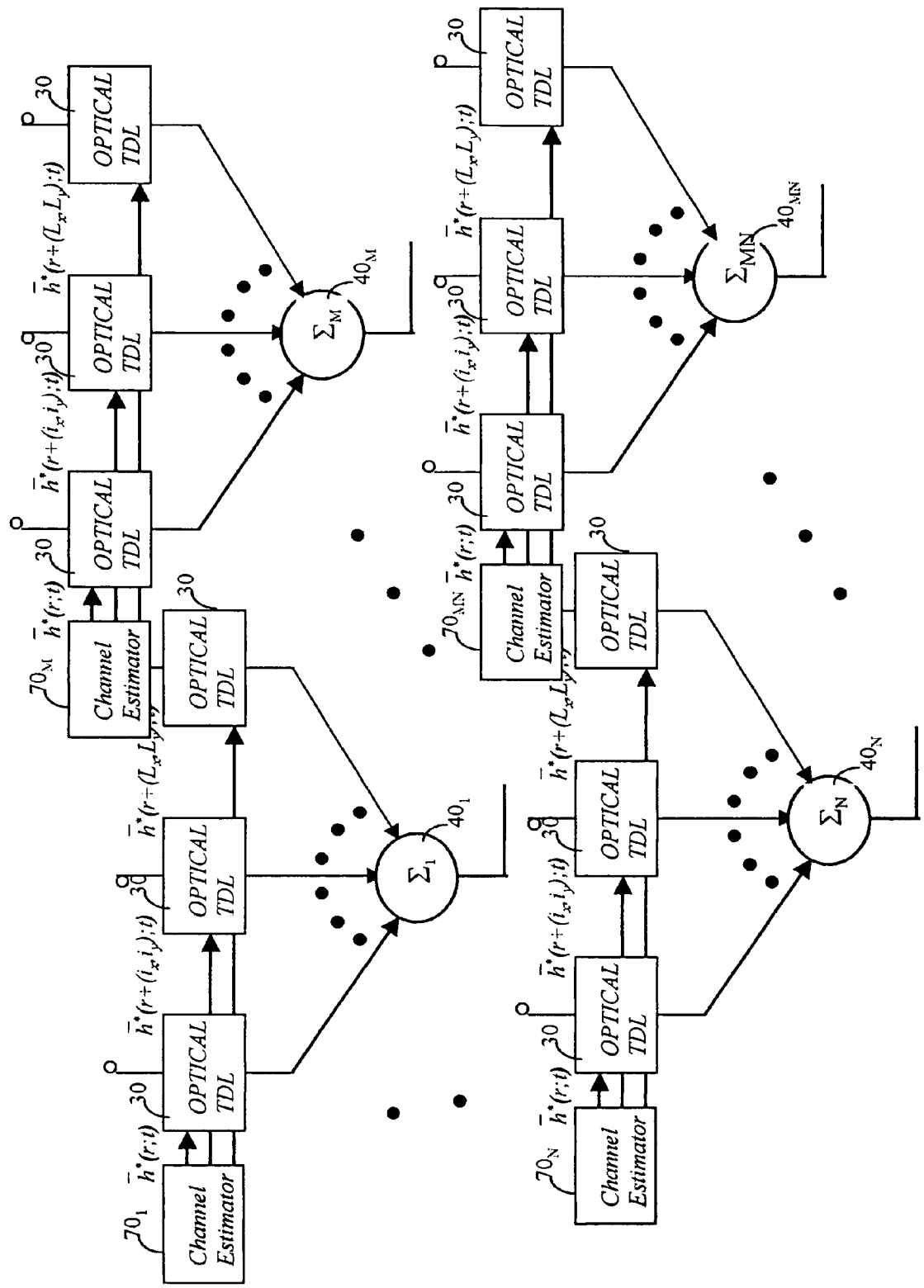
FIG. 5C is a schematic block diagram illustrating another embodiment of a space-time equalizer of scintillation and fading effects for a multi-mode multi-antenna system at the optical band.

Another embodiment of the invention of space-time equalizer in the optical frequency domain for a wireless communication link with a multi-mode multi-antenna system is illustrated in FIG. 5C. It consists of a plurality of optical tapped delay lines 20 for a plurality of modes and a plurality of antennas. They are individually summed together $40_1$ to $40_{MN}$ before optical demodulation. Space-time match filter is provided by the channel estimators, $70_1$ to $70_{MN}$.

This invention is not to be limited by the embodiment shown in the drawings and described in the description which is given by way of example and not of limitation, but only in accordance with the scope of the appended claims.

What is claimed is:

1. A system for mitigating the effects of scintillation on a wireless link comprising;
    a channel estimator generating a channel match filter output;
    at least one summer;
    a plurality of tapped delay lines connecting each spatial sampling point around an original wireless link feed, receiving said channel match filter output from said channel estimator to perform space-time equalization by recombining the space-time spread signal from the effects of scintillation by said summer.

2. The system according to claim 1 in which said wireless link is an RF wireless link having at least one feed; said plurality of tapped delay lines are a plurality of baseband tapped delay lines.

3. The system according to claim 2 in which said RF wireless link having at least one feed is an RF wireless link having multiple feeds.

4. The system according to claim 3 in which said RF wireless link having multiple feeds is an RF wireless link having multiple feeds and multiple antennas.

5. A system according to claim 4 in which said at least one summer is a plurality of summers for summing the outputs of said multiple feeds and multiple antennas.

6. The system according to claim 4 in which said channel estimator comprises a power spectrum computer for computing the space-time channel power spectrum.

7. A system according to claim 3 in which said at least one summer is a plurality of summers for summing the outputs of said multiple feeds.

8. The system according to claim 3 in which said channel estimator comprises a power spectrum computer for computing the space-time channel power spectrum.

9. The system according to claim 1 in which said wireless link is an optical wireless link having at least one mode; said plurality of tapped delay lines are a plurality of baseband tapped delay lines.

10. The system according to claim 9 in which optical wireless link having at least one mode is an optical wireless link having multiple modes.

11. The system according to claim 10 in which optical wireless link having multiple modes is an optical wireless link having multiple modes and multiple antennas.

12. A system according to claim 11 in which said at least one summer is a plurality of summers for summing the outputs of said multiple modes and multiple antennas.

13. The system according to claim 11 in which said channel estimator comprises a power spectrum computer for computing the space-time channel power spectrum.

14. The system according to claim 10 in which said at least one summer is a plurality of summers for summing the outputs of said multiple modes.

15. The system according to claim 10 in which said channel estimator comprises a power spectrum computer for computing the space-time channel power spectrum.

16. The system according to claim 1 in which said wireless link comprises an RF wireless link having at least one feed; said plurality of tapped delay lines are a plurality of RF tapped delay lines.

17. The system according to claim 16 in which said RF wireless link is an RF wireless link having multiple feeds.

18. The system according to claim 17 in which said RF wireless link having multiple feeds is an RF antenna system with multiple feeds and multiple antennas.

19. A system according to claim 18 in which said at least one summer is a plurality of summers for summing the outputs of said multiple feeds and multiple antennas.

20. The system according to claim 18 in which said channel estimator comprises a power spectrum computer for computing the space-time channel power spectrum.

21. The system according to claim 17 in which said at least one summer is a plurality of summers for summing the outputs of said multiple feeds.

22. The system according to claim 17 in which said channel estimator comprises a power spectrum computer for computing the space-time channel power spectrum.

23. The system according to claim 1 in which said wireless link is an optical wireless link having at least one mode; said plurality of tapped delay lines are a plurality of optical tapped delay lines.

24. A system according to claim 23 in which optical wireless link having at least one mode is an optical wireless link having multiple modes.

25. A system according to claim 24 in which optical wireless link having multiple modes is an optical wireless link having multiple modes and multiple antennas.

26. The system according to claim 25 in which said at least one summer is a plurality of summers for summing the outputs of said multiple modes and multiple antennas.

27. The system according to claim 25 in which said channel estimator comprises a power spectrum computer for computing the space-time channel power spectrum.

28. The system according to claim 24 in which said at least one summer is a plurality of summers for summing the outputs of said multiple modes.

29. The system according to claim 24 in which said channel estimator comprises a power spectrum computer for computing the space-time channel power spectrum.

30. A method of mitigating the effects of scintillation on a wireless link comprising;
processing the physical channel measurement data by hardware means to generate an estimate of the space-time channel power-spectrum;
processing of a space-time channel power-spectrum by hardware means to derive a space-time channel match filter output;
processing, by hardware means, a wireless link by spatial sampling the wireless signal having at least one feed and temporal sampling with a plurality of tapped delay lines and said channel match filter output for the equalization of a space-time spread signal;
finally, summing by signal combiners said space-time spread signal output of said plurality of tapped delay lines to perform a space-time equalization thereby, removing the effects of scintillation.

31. The method according to claim 30 in which said wireless link having at least one feed being processed with a plurality of baseband tapped delay lines is an RF wireless link with baseband equalization.

32. The method according to claim 31 in which said RF wireless link having multiple feeds being processed with a plurality of baseband tapped delay lines is a multi-feed RF wireless link with baseband equalization.

33. The method according to claim 32 in which said RF wireless link having multiple feeds, multiple antennas being processed with a plurality of baseband tapped delay lines is a multi-feed, multi-antenna RF wireless link with baseband equalization.

34. The method according to claim 30 in which said wireless link having at least one mode being processed with a plurality of baseband tapped delay lines is an optical wireless link with baseband equalization.

35. The method according to claim 34 in which said optical wireless link having multiple modes being processed with a plurality of baseband tapped delay lines is a multi-mode optical wireless link with baseband equalization.

36. The method according to claim 35 in which said optical wireless link having multiple modes and multiple antennas with a plurality of baseband tapped delay lines is a multi-mode, multi-antenna optical wireless link with baseband equalization.

37. The method according to claim 30 in which said wireless link having at least one feed being processed with a plurality of RF tapped delay lines is an RF wireless link with RF equalization.

38. The method according to claim 37 in which said RF wireless link having multiple feeds being processed with a plurality of RF tapped delay lines is a multi-feed RF wireless link with RF equalization.

39. The method according to claim 38 in which said RF wireless link having multiple feeds, multiple antennas being processed with a plurality of RF tapped delay lines is a multi-feed, multi-antenna RF wireless link with RF equalization.

40. The method according to claim 30 in which said wireless link having a lest one mode being processed with a plurality of optical tapped delay lines is an optical wireless link with optical equalization.

41. The method according to claim 40 in which said optical wireless link having multiple modes being processed with a plurality of optical tapped delay lines is a multimode optical wireless link with optical equalization.

42. The method according to claim 41 in which said optical wireless link having multiple modes, multiple antennas being processed with a plurality of optical tapped delay lines is a multi-mode, multi-antenna optical wireless link with optical equalization.

* * * * *